United States Patent

Guckel

[15] 3,687,261

[45] Aug. 29, 1972

[54] CONVEYING SYSTEM

[72] Inventor: Gerhart A. Guckel, Los Altos, Calif.

[73] Assignee: James Dole Corporation, San Francisco, Calif.

[22] Filed: April 2, 1971

[21] Appl. No.: 130,725

Related U.S. Application Data

[62] Division of Ser. No. 741,393, July 1, 1968, Pat. No. 3,606,997.

[52] U.S. Cl....................................................198/25
[51] Int. Cl..............................................B65g 47/04
[58] Field of Search.....198/103, 22 R, 22 B, 25, 212; 21/80

[56]  References Cited

UNITED STATES PATENTS

2,863,550  12/1958  Hommel......................198/25

*Primary Examiner*—Edward A. Sroka
*Attorney*—Stanley Bialos

[57]  ABSTRACT

A horizontally positioned rotor in an aseptic canning system, particularly adapted for glass jar containers, is rotatable about an upright axis in an enclosed container sterilizer housing having an entrance and an exit for the containers. A plurality of peripheral pockets open toward the periphery of the rotor continuously convey the containers. Vacuum is applied to the pockets beyond the entrance to withdraw air, and saturated steam under superatmospheric pressure is applied between the vacuum and the exit to sterilize the containers. Pressure is relieved by a bleed connection between the steam application and the exit, which leads to a location adjacent but ahead of the entrance to thus provide a pressure seal against entrance of outside air into the sterile portion of such container sterilizer.

2 Claims, 10 Drawing Figures

INVENTOR.
GERHART A. GUCKEL
BY
*Stanley Bidol*
ATTORNEY

INVENTOR.
GERHART A. GUCKEL
BY Stanley Bialos
ATTORNEY

3,687,261

CONVEYING SYSTEM

This application is a division of applicant's copending application, Ser. No. 741,393, filed July 1, 1968, now U.S. Pat. No. 3,606,997, dated Sept. 21, 1971.

This invention relates to the preservation of products in sealed containers, especially glass jars although applicable to metal containers, wherein a sterile food product is introduced into previously sterilized containers, and the containers are subsequently sealed with sterilized covers or lids, known as aseptic canning, and more particularly, to an improved type of container sterilizer.

BACKGROUND OF THE INVENTION

Aseptic canning is well known and is now commonly employed for canning products in the usual type of open top metal containers. Such canning in glass jars presents a special problem because jars are subject to breakage if mishandled, and to thermal shock. The patents to Whitmore U.S. Pat. No. 2,862,822, dated Dec. 2, 1958 and to Whitmore U.S. Pat. No. 3,016,666, dated Jan. 16, 1962 disclose an apparatus and method wherein glass jars are sterilized by saturated steam under superatmospheric pressure at an elevated sterilizing temperature for a relatively short time, so that heat does not penetrate into the interior body of the container and thereby cause thermal shock. This is also known as skin sterilization. In the apparatus of the patents, the container sterilizer comprises a vertically arranged rotor provided with a succession of pockets and which is rotatable about a horizontal axis, thus requiring the containers to be twisted to an upright position when discharged from the sterilizer into the remainder of the system.

Also, in such apparatus the arrangement of a steam connection for discharge from the apparatus is such that the steam pops out with explosive force; and there is no provision of utilizing exhaust steam for maintaining a pressure seal at the entrance portion of the sterilizer for the containers.

SUMMARY AND OBJECTS

The invention hereof is an improvement of the system disclosed in the aforementioned patents, and overcomes the foregoing problems. It comprises a rotor type container sterilizer provided with an entrance for the containers open to the atmosphere and with an exit for such containers after they have been sterilized. The rotor has a succession of pockets for conveying the containers to be sterilized; and advantageously the rotor is rotatable about an upright axis, so that the containers are conveyed upright. Beyond the container entrance, a vacuum is applied to remove air from the containers and the pockets instead of sweeping air out therefrom by means of steam as in the aforementioned patents. This insures that there is no dead air left in the containers which would provide a non-sterile dead pocket at the bottom of the containers when the steam is introduced into the pockets and the containers. Between the vacuum applying means and the exit, means is provided for introducing steam under superatmospheric pressure at an elevated temperature, into the pockets and the containers to sterilize the containers.

A pressure relief outlet is provided between the steam introducing means and the sterilizer container exit, with a second steam relief outlet adjacent but ahead of the container entrance. Piping is connected between these outlets, and a throttle valve is connected in such piping. This results in discharge of steam from the apparatus with substantially no explosive effect. Also, the second outlet is so located with reference to the container entrance that a pocket full of steam is discharged through the container entrance at one time; and this discharged steam forms a pressure barrier seal against entrance of non-sterile atmospheric air into the sterile side of the sterilizer ahead of the entrance, thus obviating contamination.

The container sterilizer rotor hereof is of special construction in which spring pressed seals are provided in the spokes of the rotor between the pockets which seal against the container sterilizer side wall to effectively maintain a seal at the periphery of the pockets. Also, the rotor is floatingly supported by the bottom wall of the container sterilizer housing and engages bottom seal on such wall to seal open bottoms of the pockets. Such bottom seal is of heat-resistant, shock-absorbing material, which is self-lubricating, and provides a friction minimizing bearing for the rotor, as well as a seal to maintain pressure in the sterilizer. The top of the rotor has minimum clearance relative to the top of the sterilizer housing, and is for all practical purposes substantially sealed. However, an O-ring seal on the top of the rotor in back of the rotor pockets is preferably provided, which engages the underside of the top of the container housing.

To provide a cushion, especially for glass jar containers, when they are introduced into the pockets of the sterilizer rotor, and to prevent thermal shock on such containers which might result in shattering, the rear face of the respective pockets is provided with heat-resistant and insulating cushioning material, which also spaces the back side of the containers from the rear face of the rotor pockets. This space is also important in allowing steam to flow along the back sides of the containers to obtain effective sterilization of the entire container in a minimum period of time. Shields of the same type of material are provided along the sides of each pocket, also to prevent thermal shock being imparted to glass containers when introduced into the pockets, which might otherwise occur if a relatively cold glass jar were to contact hot metal.

A retaining lip is provided at the rear of the pockets to engage the top portion of a jar introduced therein and minimize jarring or bouncing which would otherwise occur as a result of the high pressure steam introduced into the pockets. Also, to cooperate in minimizing bouncing of the jars, the tops of the spokes between the pockets are respectively provided with a bleed notch to allow expansion of the steam and thus reduce its velocity.

After leaving the container sterilizer, the containers are conducted in an upright position into a filler wherein a sterile food product is introduced into the containers, and then into a cover applying housing wherein sterilized covers are applied to the containers. Sterile conditions are maintained in the filler and in the cover applying means by introduction therein of a sterile gas, such as superheated steam or sterile air; and all of the apparatus beyond the container sterilizer is provided with enclosures so that a steady flow of the sterilizing medium introduced therein will maintain sterile conditions by preventing inflow of the outside air into such apparatus.

Because the containers are conveyed in upright position through the container sterilizer and the rotor spokes engage the side wall of the sterilizer housing to maintain the rotor pockets sealed, special means is provided to remove the containers from the rotor pockets and direct them to the sterilizer exit in upright position. Such means comprises a well adjacent the container exit to allow the containers to drop by gravity and expose bottom portions thereof below the rotor. A stripper bar engages the backs of the exposed portions to direct the containers to the exit from which they are conveyed away by a star-wheel.

From the preceding, it is seen that the invention has as its objects, among others, the provision of an improved rotor type container sterilizer wherein saturated steam under superatmospheric pressure is introduced to sterilize the containers, and which is provided with improved means: to eliminate the explosive effect of such pressure steam discharged from the container sterilizer, and to provide for a steam pressure seal at the container entrance of the sterilizer to preclude contamination; to seal container conveying pockets in a rotatable rotor in such sterilizer; to support the rotor for rotation about an upright axis to enable the containers to be conveyed in upright position, and at the same time to provide a floating support of said rotor by the bottom of the sterilizer housing; to preclude thermal and physical shock being imparted to containers when they are of glass; to preclude undue bouncing or jarring of the containers as a result of steam pressure; to direct the containers out of the sealed pockets of the horizontally positioned rotor of the sterilizer while the containers are in upright position without the necessity of employing mechanical ejection means; and which is efficient and of simple and economical construction.

Other objects will become apparent from the following more detailed description and accompanying drawings in which:

DETAILED DESCRIPTION

Figure 1:
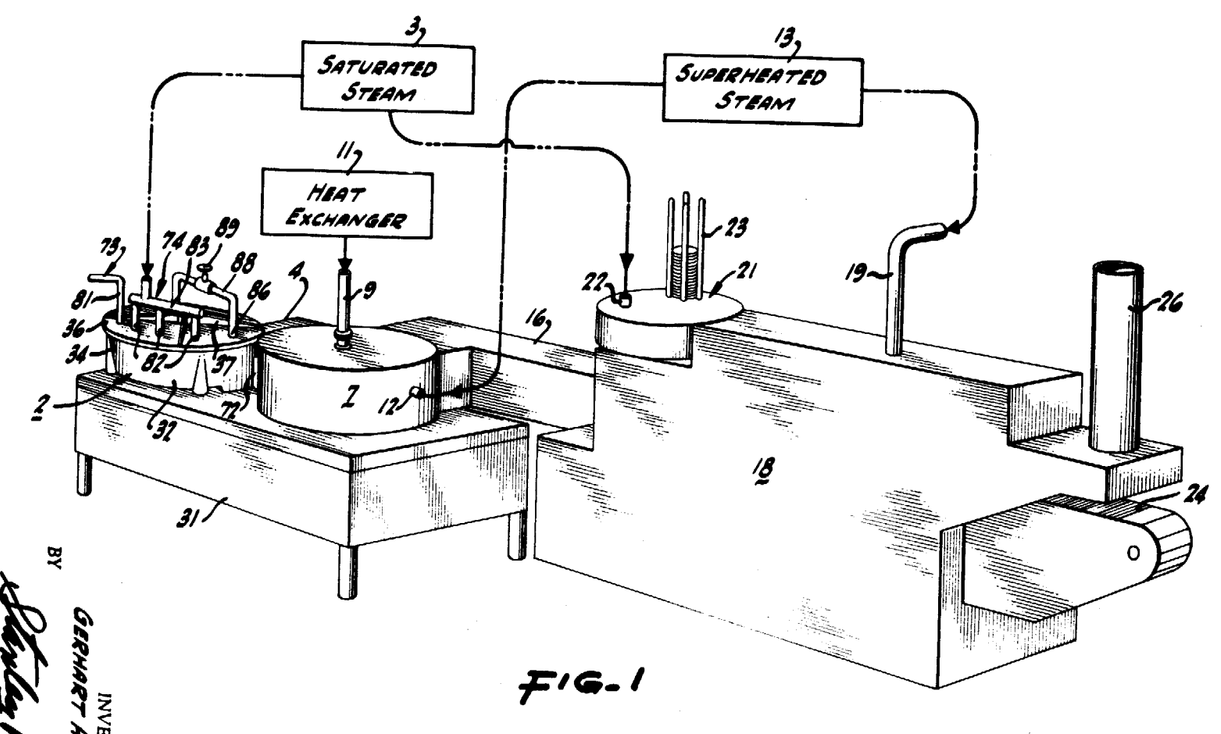
FIG. 1 is a more or less schematic elevational view of the entire apparatus hereof, especially adapted for glass or in other words, vitreous containers although applicable to metal containers.
Figure 2:
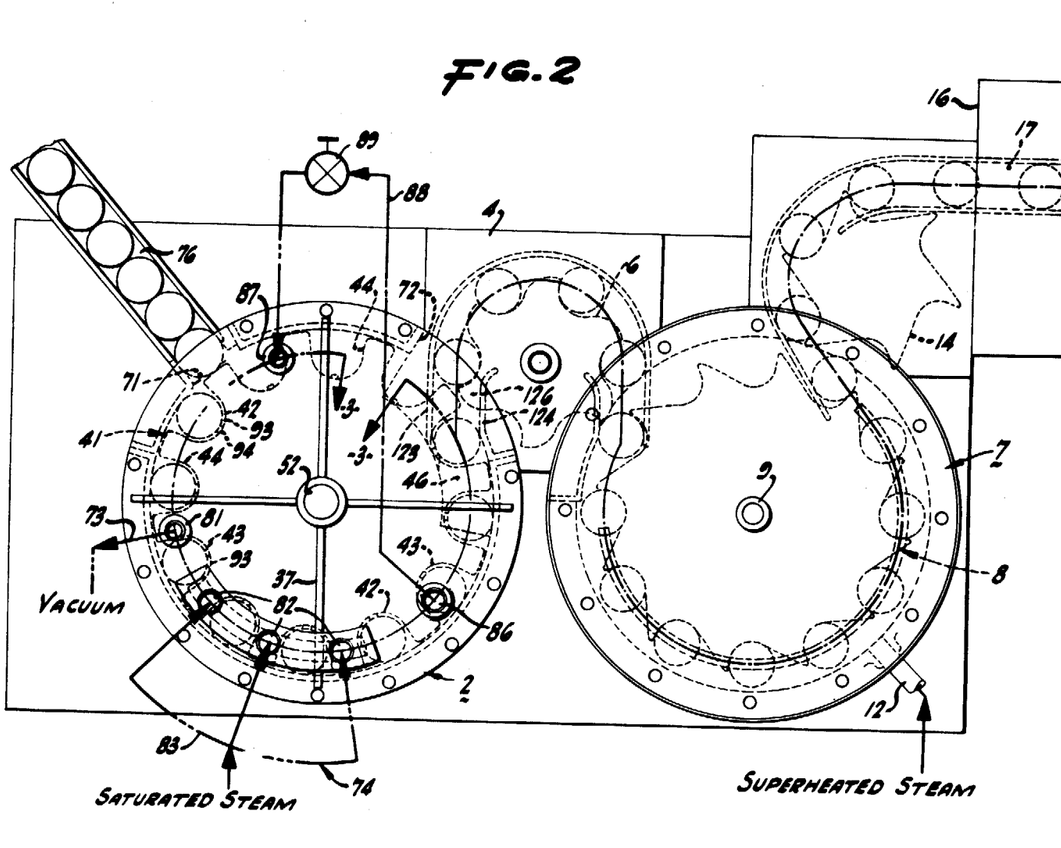
FIG. 2 is a plan view of the container sterilizer and product filler portion of the apparatus.

With reference to FIGS. 1 and 2, the over-all apparatus comprises horizontally positioned container sterilizer 2 (the construction of which will be described later in detail) in which the containers are sterilized by saturated steam under superatmospheric pressure introduced into the top of the sterilizer from a suitable source of saturated steam 3. Connected to the container sterilizer in an enclosure, is a transfer section 4 having a rotatable star-wheel 6 through which the sterilized containers are conveyed by the star-wheel into a product filler 7 which is of any suitable construction but desirably of the circular slit-filler type disclosed in assignee's patent to applicant U.S. Pat. No. 3,116,785 wherein the containers are conveyed by means of star-wheel 8.

Product, usually a flowable product such as milk or puree, is pumped into the filler through piping 9 after it has been presterilized in a conventional manner by so-called flash sterilization in a heat exchanger indicated at 11 wherein the product is heated to a high temperature for a short time and then cooled; and cooled product flows into the containers. A sterile gas is introduced into the product filler to maintain the interior thereof sterile; and this gas flows into the transfer section 4 to maintain it sterile also. Desirably, dry superheated steam at atmospheric pressure is introduced into the product filler at 12 from a suitable source 13.

From the product filler the filled containers are conveyed by star-wheel 14 into another transfer section 16 having an endless conveyor 17 for conveying the filled containers into a cover or lid applying enclosure 18. Superheated steam at atmospheric pressure is also introduced by piping 19 into the lid applying enclosure to maintain sterile conditions therein. For application to glass jars to which the invention hereof is particularly applicable, although it can be employed for metal containers, the cover applying enclosure is of the well known type which automatically feeds conventional metal caps for the jars, and applies them under a vacuum seal to the jars in timed relationship. A suitable machine, as exemplified in the patent to Davis U.S. Pat. No. 2,319,213, dated May 18, 1943, is an Anchor 16 Spindle, rotary vacuum machine, manufactured by Anchor Hocking Glass Corporation of Lancaster, Ohio.

Connected to the cover applying enclosure is an enclosed cover sterilizer 21 having a connection 22 for introduction of sterilizing medium, desirably saturated steam under superatmospheric pressure, to sterilize the covers which are fed in a stack held by upright stacker rods 23 as is illustrated in the aforementioned U.S. Pat. No. 2,319,213. The covered and sealed filled containers are discharged from the cover applying section by endless conveyor 24; and a conventional vent 26 is provided for exhaust gases.

Although flow of superheated steam is advantageously employed for maintaining sterile conditions in certain portions of the apparatus as shown in FIG. 1, any other suitable sterile gas, such as sterile air may be utilized in such portions. If metal containers are employed instead of glass jars, the cover applying and sterilizing apparatus may be of the type disclosed in assignee's patent to Martin U.S. Pat. No. 2,685,520, dated Aug. 3, 1954.

CONTAINER STERILIZER

Referring particularly to FIGS. 1, 2, 4 and 5, container sterilizer 2 is horizontally positioned on a support table 31 and comprises cylindrical metal housing 32, such as case iron, having a bottom wall 33, an integral side wall 34 and a top cover wall 36 reinforced by integral ribs 37. The cover is removably but rigidly secured to side wall 34 by cap screws 38, as can be seen from FIG. 6.

Figure 4:
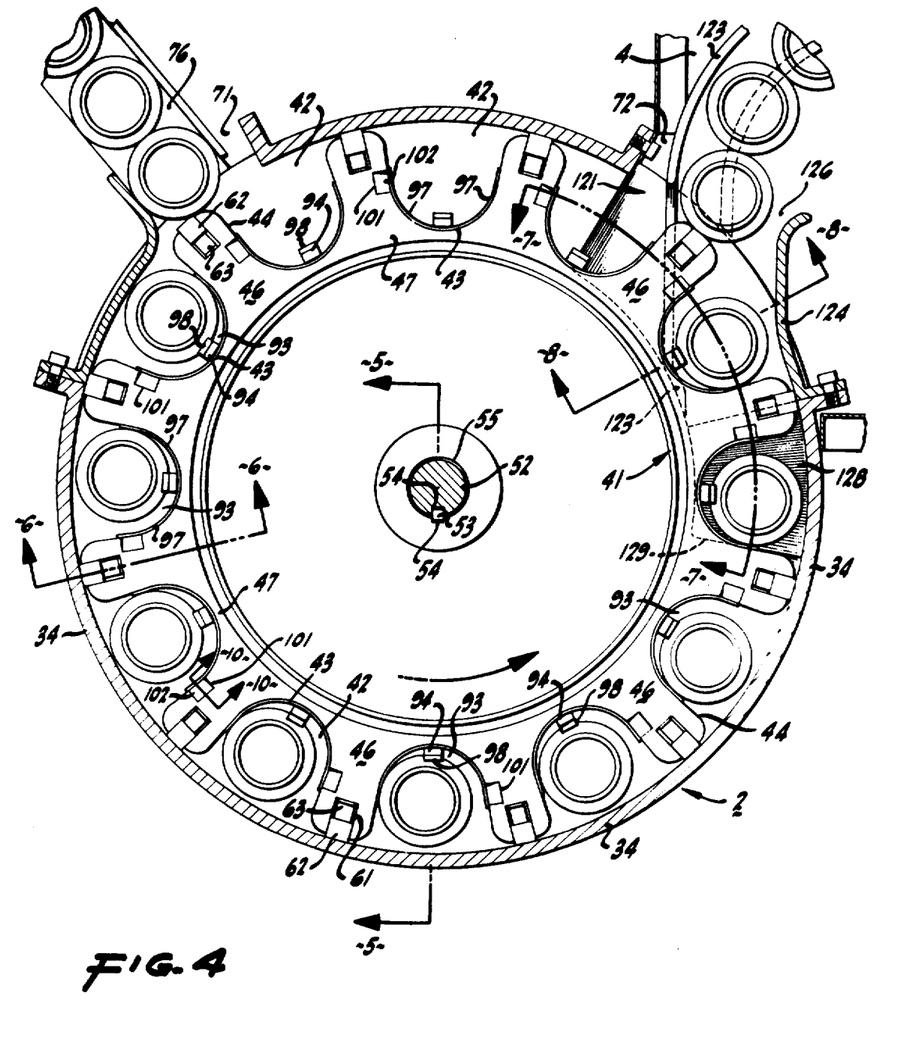
FIG. 4 is a plan view of the container sterilizer with the cover of the sterilizer removed.
Figure 5:
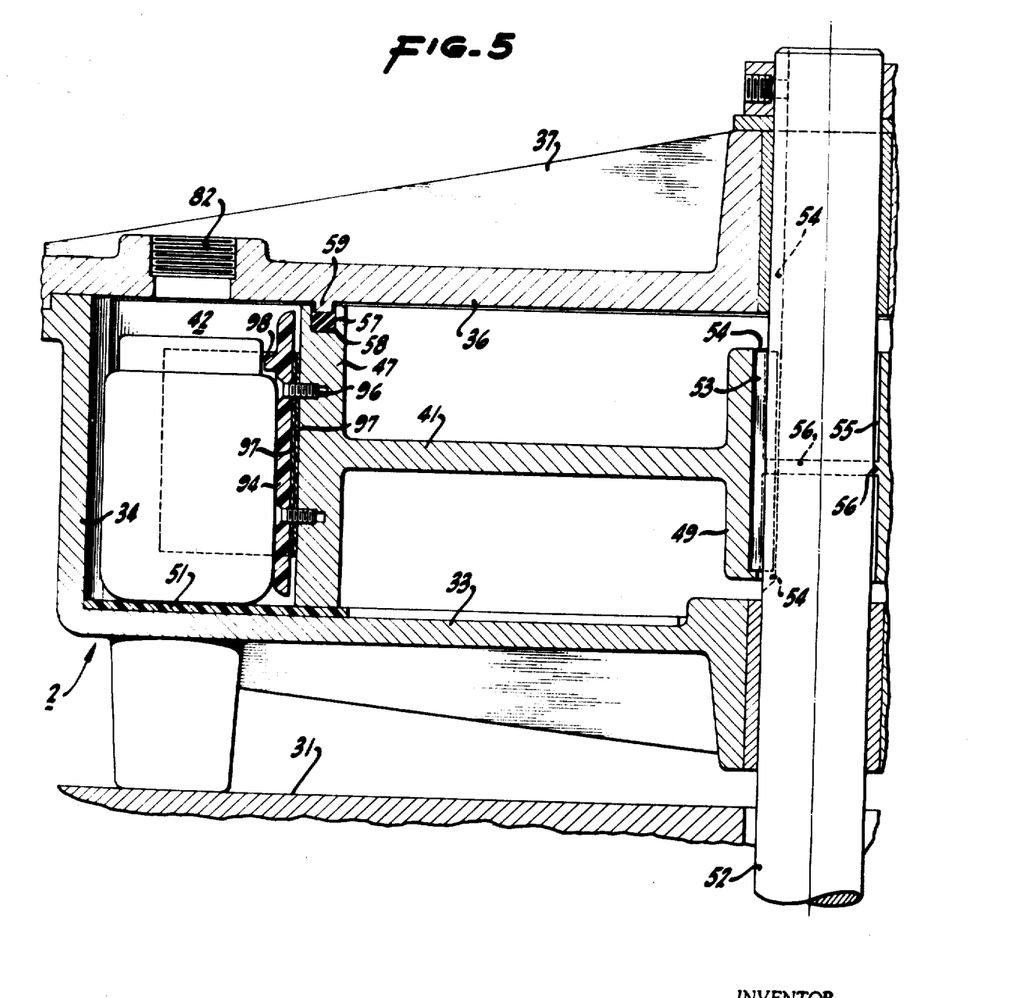
FIG. 5 is a fragmentary vertical section of the container sterilizer with the cover on, taken in a plane indicated by line 5—5 in FIG. 4.

A turret type metal rotor 41, also preferably of case iron, has a series of peripheral pockets 42 open toward the periphery and at their bottoms. Rear faces 43 of the pockets are arcuate, and their side walls 44 are formed by radial spokes 46 extending to housing side 34. The rotor is rotatable in the container housing 32 about an upright axis, and the containers are conveyed horizontally in an upright position. The rear walls of such pockets 42 are an integral part of an upright circular ring 47 integral with spokes 46 which are spaced from the top and the bottom of housing 32 and in turn, integrally connected to rotor hub 49.

Rotor 41 is floatingly supported by the bottom wall 33 of the housing; and for this purpose, the bottom of the outer periphery of the rotor (the pocket portion thereof) engages a sealing ring 51 resting on the bottom wall 33 of the housing, while rotor hub 49 is spaced from such bottom wall. It has a slack or in other words, a loose connection with a rotor drive shaft 52 to enable the rotor to move slightly relative to the drive shaft, and thus engage sealing ring 51 evenly around the entire peripheral portion thereof. Such connection comprises key 53 engaging with slight radial clearance of about one-sixteenth inch in keyways 54 in drive shaft 52 and the rotor hub. Also, hub 49 has clearance of about the same amount, indicated at 55, about drive shaft 52 except at a short centering flange 56 integral with the hub. Thus, the rotor can pivot freely about centering flange 56 to provide in effect a universal joint connection between the drive shaft and the hub. The amount of the aforementioned clearance is, however, not critical as long as the rotor is floatingly supported. Because of the described floating support, binding of the rotor resulting from expansion of metal under the high temperature of the saturated steam is eliminated, and a tight bottom seal for pockets 42 is obtained by the weight of the rotor against sealing ring 51.

Sealing ring 51 extends inwardly beyond rotor pockets 42, and its periphery engages the housing side wall 34. It is of any suitable heat and wear-resistant material, which at the same time is self-lubricating or in other words, friction minimizing to allow the rotor and the containers conveyed thereby to slide readily thereover. For glass, the material is also desirably heat-insulating to avoid thermal shock and also yieldable to provide cushioning for glass jars. Molded "Teflon" (tetrafluoroethylene resin by Du pont), is advantageously employed for such purpose, and is preferred. Other suitable resins are resin impregnated fabrics having well known types of slip additives incorporated therein, molded silicone resins, and molded polyethylene with slip additives to provide self-lubricating properties.

The top of the pocket portion of the rotor fits only with slight clearance under the top of the container housing in the order of about 0.002 to 0.003 of an inch to prevent binding by expansion of the metal under the high operating temperatures of the container sterilizer but such slight clearance provides for all practical purposes a top seal for the rotor. However, to enhance the seal at the top, rotor ring 47 is preferably formed in back of pockets with a circular groove 57 in which is seated an O-sealing ring 58. An integral circular flange 59 on the underside of top cover 36, extends into the groove and rides on ring 58 as the rotor rotates. There is slight clearance in the order of about 0.002 to 0.003 inch between the sides of the flange and the groove to obviate binding. O-ring 58 is advantageously of the same type of material, preferably Teflon, as sealing ring 51.

Means is also provided to seal pockets 42 at their peripheral portions which are open at the periphery of the rotor. As can be seen best from FIGS. 6 and 9, the end of each rotor spoke 46 is formed with a slot 61 extending the height of the rotor; and a bar of sealing material 62 of the same type previously described for bottom sealing ring 51, is slidably positioned in such slot for outward radial movement. It extends the height of the slot in sealing engagement with the housing top or cover 36 and with sealing ring 51 on the bottom, as well as with the inner surface of housing side wall 34.

Figure 6:
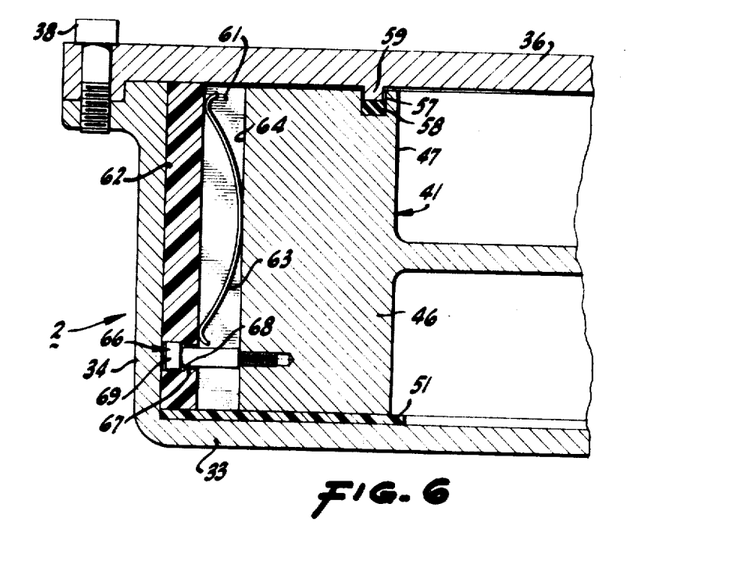
FIG. 6 is a similar view taken in the plane indicated by line 6—6 in FIG. 4.
Figure 9:
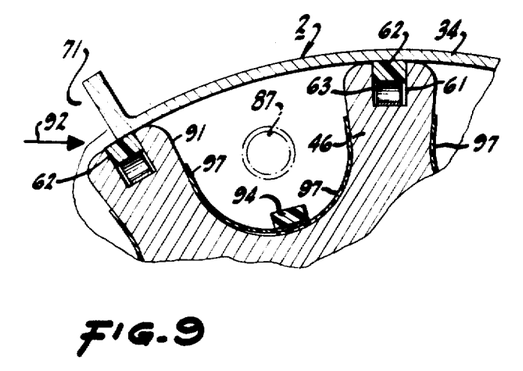
FIG. 9 is a schematic fragmentary horizontal section indicating the location of the steam discharge adjacent the container entrance of the sterilizer, to depict how a pocket full of steam is discharged at one time through the container entrance.
Figure 10:
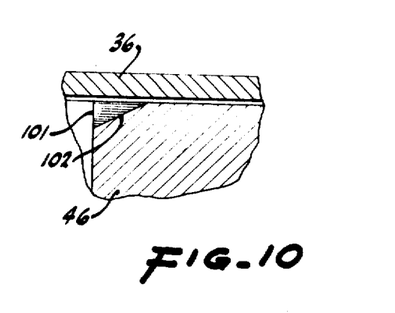
FIG. 10 is a fragmentary vertical section taken in a plane indicated by line 10—10 in FIG. 4.

Slot 61 is of greater radial depth than sealing bar 62; and a metal bow spring 63 is interposed between the inner face 64 of the slot and the rear face of the bar to resiliently press or thrust the bar against the inner surface of housing side wall 34. Thus, as the rotor rotates, bar 62 serves as a floating spring pressed seal which slides against the top and bottom of the housing and against the housing side wall, to thereby prevent steam leakage at the periphery of the rotor.

Retaining means is provided so that sealing bars 62 will not pop out as they pass an open entrance and exit in the housing side wall 34, and also be retained on the rotor spokes should the rotor be removed for any purpose. Such means comprises a keeper screw 66 secured in the ends of the respective spokes 46, and extending loosely through a hole 67 in the sealing bar. Hole 67 is countersunk to provide a retaining shoulder 68; and head 69 of screw 66 provides a stop for bar 62. The rear face of head 69 is spaced a slight distance from shoulder 68 in the outermost position of bar 62 to allow full and free floating sealing engagement of the bar against side wall 34.

Side wall 34 of the horizontally positioned container sterilizer is provided with an entrance 71 for containers, which is open to the atmosphere and with an exit 72 from which the sterilized containers are discharged into sterile transfer section 4. Between such entrance and exit, vacuum is applied at location 73 (FIG. 1), and saturated steam under superatmospheric pressure is applied at zone 74, which will be described in detail later. By the provision of the aforementioned sealing means, it will be noted that rotor pockets 42 are for all practical purposes sealed against leakage as they move between the entrance and and the exit. As a result, a substantial vacuum can be maintained, and the pressure of the saturated steam will also be maintained to provide for an elevated sterilizing temperature for the containers by not allowing substantial drop in pressure with consequent reduction in temperature.

A succession of containers is continuously introduced in upright position into entrance 71 by any suitable means, such as a conventional endless conveyor 76 shown schematically in FIG. 2; and it will be noted with particular reference to FIGS. 2 and 4 that the width of each spoke is such and the rotor is so positioned angularly, that each successive spoke 46 is opposite entrance 71 when a container is ready to enter a rotor pocket 42. This is desirable, particularly with respect to glass jars, as it precludes jamming of the respective jars at entrance 71, and thus prevents breakage. After the containers enter the respective pockets 42, and when each sealing bar 62 on the trailing spoke of a pocket moves past entrance 71 and seals against side wall 34 of the housing, such pocket becomes substantially sealed.

The vacuum applying means is connected to top housing wall 36, and includes pipe connection 81 about three pockets beyond entrance 71 to insure that as the pocket passes connection 81 it is adequately sealed. Pipe connection 81 is connected to a vacuum pump (not shown) and as high a vacuum is maintained as possible, desirably at least about 28 inches of mercury. The purpose of the vacuum is to withdraw air from the respective pockets and containers therein. Otherwise, when steam is injected into the respective pockets at steam applying zone 74, a dead air pocket might remain in the bottom of the respective containers which would be non-sterile.

Saturated steam under superatmospheric pressure to provide a temperature sufficient to effect sterilization of the containers, particularly the inside into which the food product is introduced, is injected through the top of the housing from any suitable source of such steam. It is desirably injected at three locations spaced apart about a pocket width to insure adequate sterilization of the air free containers, along zone 74 between vacuum connection 73 and exit 72, through three pipe connections 82 connected to a manifold 83. Any suitable pressure with corresponding temperature of steam may be employed as long as the containers become sterilized, especially their inside surfaces. The temperature advantageously employed is about 307°F. for a residence time of about 1½ seconds, which is obtained with saturated steam introduced at a pressure of about 60 lbs. per square inch. However, the time and temperature may vary; the less the time, the higher the temperature of the steam. A suitable range is about 300° to 325°F. for about 1 to 1 ¾ seconds to obtain skin sterilization of glass jars, as pointed out in the aforementioned U.S. Pat. Nos. 2,862,822 and 3,016,666.

It will be noted that the saturated steam is introduced through the top of the container sterilizer, and therefore the steam jets are injected directly into the inside of the upright containers as they are continuously conveyed, to effect thorough sterilization. After becoming sterilized in the steam applying zone 74, the containers are conducted by rotor pockets 42 to exit 72 from which the containers are conveyed into the transfer section 16 by means to be described later in detail.

Means is provided for bleeding the pressure steam from the container sterilizer. The means hereof is of such character as to relieve the steam pressure in a manner obviating an explosive effect which would otherwise occur with direct exhaust of the steam to the atmosphere, and to provide a pressure seal against entrance of air into the sterile portion of the container housing which is ahead of container entrance 71, namely between such entrance and steam applying zone 74. Such means comprises a first pressure release outlet connection 86 located between exit 72 and the pressure applying zone 74 and a second pressure release outlet connection 87 adjacent to but ahead of the container entrance 71, together with a piping 88 connected between these outlets in which is located a conventional needle type throttling valve 89.

Outlet 87 is located at such distance ahead of entrance 71 (about a pocket width) so that when each of successive empty trailing pockets arrives at outlet 87, the steam is released into such pocket before it becomes open to the entrance, and expands in the pocket; and when the left side 91 of such pocket, with reference to FIG. 9, opens into entrance 71 a pocket full of steam at one time is discharged through the entrance as the pocket sweeps past it. Consequently, the steam can expand into the atmosphere with hardly any or no explosive effect. In this connection, conventional adjustable throttling valve 89 is adjusted to control the rate of flow of steam through piping 88, to further reduce its velocity.

Since the steam is discharged through entrance 71 substantially a pocket full at a time, the pressure of the outgoing steam acts as a barrier or seal against inflow of outside atmospheric air in the direction toward the sterile portion of the sterilizer ahead of entrance 71, such direction being indicated by arrow 92 in FIG. 9. Consequently, there is no danger of contamination of the sterile portions of the container sterilizer by outside air flowing through entrance 71 into the sterilized portions of the entire apparatus beyond the steam applying zone 74. In this connection, the continuous flow of sterile gas introduced into the enclosed portions of the apparatus through connections 12 and 19 cooperates with the saturated steam to maintain the entire apparatus sterile after having been conventionally presterilized before use. The described steam pressure relief arrangement and steam pressure seal can be employed on a container sterilizer wherein the rotor rotates about a horizontal axis, as in the aforementioned patents.

As previously related, the container sterilizer hereof is applicable to the sterilization of conventional metal containers. However, it is particularly adapted for the sterilization of glass jar containers because the saturated steam enables so-called skin sterilization of the containers both on their inside and outside surfaces without substantial penetration of heat into the body of the glass, thus obviating shattering of glass. For such glass containers it is advantageous to provide means to obviate thermal shock on the glass, which might otherwise occur when glass jars which are relatively cool strike the hot metallic surfaces of the rotor pockets as they are introduced into the pockets through entrance 71, and consequently result in shattering of at least some of the jars.

Such means is provided herein, and at the same time, it provides space 93 between the rear wall of each pocket and the back of the container therein for allowing steam to pass around the rear of each container and effect thorough sterilization. Also, it provides a cushion to protect glass containers against physical shock.

For these purposes, a bumper or spacer bar 94 of cushioning and heat-insulating material, of the same character as seal ring 51, is secured by cap screws 96 to the rear wall of each pocket. As the respective containers enter the respective pockets from sterilizer entrance 71, they engage bumper bar 94 which cushions them, and also minimizes thermal and physical shock. To minimize possible thermal and physical shock along the sides of rotor pockets 42, a cushioning and insulating side shield 97 of material of the same character as ring 51 and bar 94, extends along each side of the respective pockets from adjacent the bumper bar; the shields being secured in back of bumper bar 94 by the same cap screws 96.

When steam is directed into the containers there is a tendency for them to bounce in the rotor pockets because of the velocity of the steam at the high pressure under which it is injected. With metal containers, such bouncing is of no import but for glass jars breakage might occur if the bouncing is pronounced. To minimize such bouncing, each bar 94 is provided with a forwardly extending lip 98 at a distance sufficiently high above the bottom of the pocket so as to extend over a top portion of the container. This top portion may be the top edge of the container or in case of glass jars the usual shoulder thereof below the top edge. Lip 98 may be molded integrally with bumper bar 94 or be a separate piece attached to the bar in any suitable manner.

As there is only very slight clearance between the top edge of the rotor spokes 46 and the top of the container housing, there is some leakage steam which passes through such narrow space at a high velocity. In the case of glass jars the high velocity steam hitting the jars may cause shattering as a result of bouncing of the jars. To restrict such bouncing or disturbance, the top of the trailing side of each spoke is provided with a notch 101 about one third of the width of the spoke, which has a downwardly slanting surface 102 leading to the trailing side of the spoke. The notch serves as a deflector to reduce steam velocity and allow steam expansion as steam rushes through the narrow space between the spoke and the top of the container housing, and consequently substantially obviates jar disturbance. Notch 101 is preferably about one-quarter of an inch in width, about an inch long and the lower edge thereof about one-eighth inch from the top edge of the spoke.

Because the spokes of the rotor extend to the inner surface of the sterilizer housing side wall 34 and the containers are conveyed in horizontal upright position in substantially sealed pockets 42, it is necessary to provide special means for directing the containers toward and out of the exit 72. The means hereof is of a simple character not requiring special mechanical ejection mechanism operable by cams which might break glass containers. Also, it permits the containers to be conducted in upright position throughout the entire system, thus minimizing breakage of glass jars which might otherwise occur as jars are twisted from a position in which they are conveyed with their axes in a horizontal position as in a pocketed rotor rotatable about a horizontal axis, and then twisted to upright position.

Figure 3:
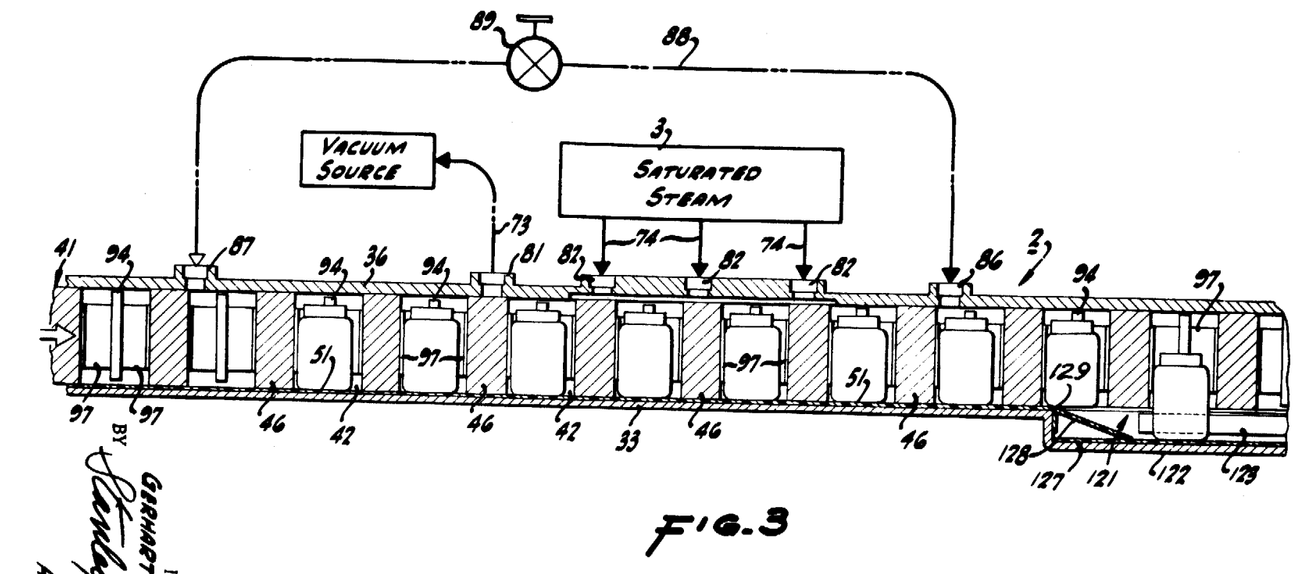
FIG. 3 is a developed sectional view along the arcuate line 3—3 in FIG. 2 but with the parts laid out in a linear direction.
Figure 7:
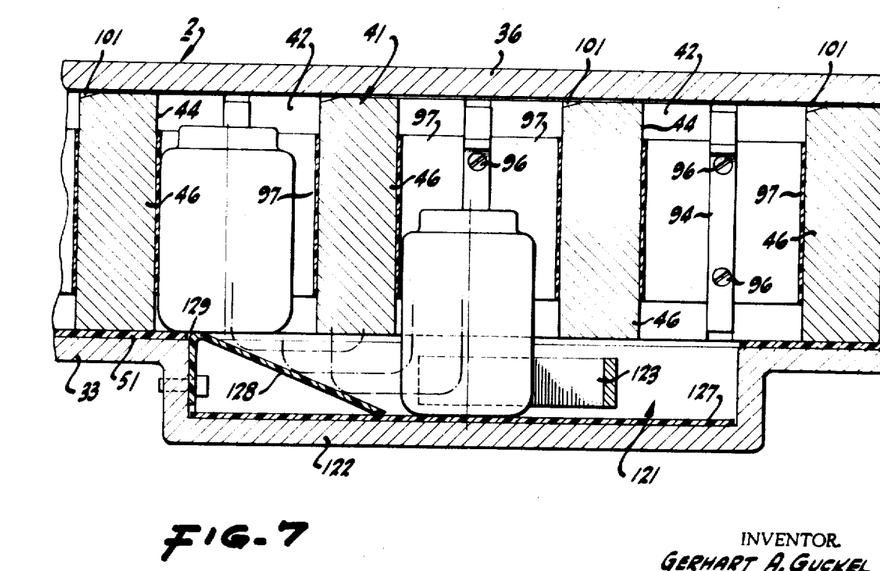
FIG. 7 is a vertical section taken along the arcuate line 7—7 in FIG. 4.
Figure 8:
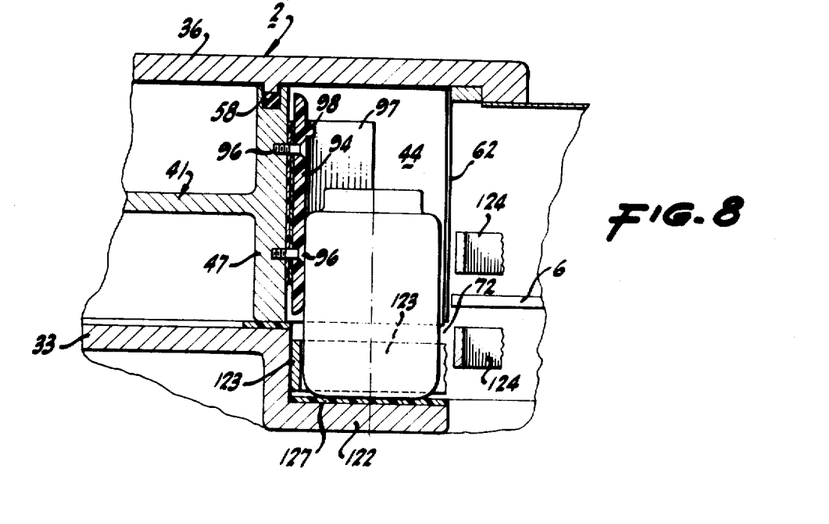
FIG. 8 is a vertical section taken in a plane indicated by line 8—8 in FIG. 4.

As shown in FIGS. 3 and 7, the bottom wall of the container sterilizer adjacent exit 72 is provided with a well 121 the bottom 122 of which is below the main bottom portion of the sterilizer a short distance less than the height of the containers. Consequently, because of such short distance before the containers arrive at sterilizer exit 72 they drop or lower gently by gravity into the well to expose their lower portions below pockets 42 of the rotor. This enables a stationary stripper bar 123 which extends below the rotor to engage the rear portions of the containers and direct them outwardly of exit 72 as the rotor rotates.

Guide bars 124 extending from adjacent side wall 34 of the sterilizer housing and opposite stripper bar 123 cooperate with the stripper bar 123 to provide a chute 126 for guiding the containers toward exit 72 as they are conveyed by the rotor, whereupon they are picked up by star-wheel 6 in the transfer section 4.

The described well and stripper bar arrangement is applicable to any horizontally positioned pocketed conveying rotor for conveying any type of objects. It is advantageous because it does not require mechanical ejection mechanism to eject the objects from the pockets.

Desirably, the bottom of the well is covered with a sheet 127 of plastic material of the same type as sealing ring 51 to provide a cushion for reducing shock on glass containers as they drop into the well, and to facilitate sliding of the containers along the bottom of the well. A downwardly sloping ramp 128 of similar material is advantageously provided, which leads from adjacent the beginning of the well at 129 to the bottom of the well, to permit gradual lowering of the containers into the well and thus cooperate in reducing physical shock on the containers were they to drop suddenly. This ramp is especially applicable for glass jar containers but is not essential for metal or non-shatterable containers.

Any suitable driving mechanism is provided for driving rotor drive shaft 52 and all other container conveying mechanism and cover conveying mechanism of the entire apparatus in correlated timed relationship, conventionally employed in the food processing art.

The particular embodiment of the container sterilizer illustrated is especially adapted for the sterilization of conventional 7½ ounce glass jars, known as junior food jars, which are approximately 2 9/16 inches in diameter and about 4 inches high. Rotor 41 is about 19 ½ inches in outside diameter and about 4 ½ inches in height. The pockets are about 2 ⅞ inches deep and about 3 ½ inches in width at their mouths. The rotor is rotated at about 8 ⅓ rpm per minute, providing a total passage of time of containers from entrance 71 of the sterilizer through exit 72 of about 4 seconds with a residence time, as previously related, in the steam applying zone 74 of about 1 ½ seconds.

These dimensions and factors are not critical and will vary widely depending upon the type of containers employed and the sterilization temperature desired; and in this connection, as is well known in the art, sterilization of the containers is a time-temperature factor, namely, the longer the time, the lower the temperature and vice versa.

I claim:

1. A conveying system comprising a substantially horizontally positioned cylindrical enclosure provided with a bottom and a side wall, the side wall having an exit opening, a rotor rotatable within said enclosure and having open bottom pockets around and open toward the periphery thereof for conveying objects in sliding engagement along the bottom wall, the bottom wall being provided with a well adjacent to and ahead of said exit, the bottom of said well being below the main bottom portion of the housing a distance less than the height of said objects, to allow the bottom portions of said objects to lower into the well before they arrive at said exit to thereby expose said bottom portions of the objects below said pockets, and a stripper member between said exit and said well extending into said well below the rotor to engage the exposed portions of the respective objects and direct them toward said exit.

2. The conveying system of claim 1, wherein the objects are glass jars, and a downwardly sloping ramp is provided leading from adjacent the beginning of to the bottom of said well to enable gradual lowering of said jars by gravity.

* * * * *